United States Patent [19]

Kim

[11] 3,925,361

[45] Dec. 9, 1975

[54] 2,3,4,5-TETRAHYDRO-1H-1,4-BENZODIAZEPINE-4-CARBOXAMIDINES

[75] Inventor: Dong H. Kim, Wayne, Pa.

[73] Assignee: American Home Products Corporation, New York, N.Y.

[22] Filed: Aug. 1, 1974

[21] Appl. No.: 493,813

[52] U.S. Cl. .......................... 260/239 BD; 424/244
[51] Int. Cl.² ........................................ C07D 243/14
[58] Field of Search ............................ 260/239 BD

[56] References Cited
UNITED STATES PATENTS 3,384,635   5/1968   Carabateas ..................... 260/239

*Primary Examiner*—Paul M. Coughlan, Jr.
*Assistant Examiner*—David B. Springer
*Attorney, Agent, or Firm*—David E. Frankhouser

[57] ABSTRACT

2,3,4,5-Tetrahydro-1H-1,4-benzodiazepine-4-carboxamidine and the 1-alkyl and 7-halo derivatives thereof have hypotensive activity.

4 Claims, No Drawings

2,3,4,5-TETRAHYDRO-1H-1,4-BENZODIAZEPINE-4-CARBOXAMIDINES 2,3,4,5-Tetrahydro-1H-1,4-benzodiazepine is described by Uskokovic et al., *J. Org. Chem.*, 27, 3606 (1962). The 1-methyl-4-aryl derivatives thereof are described by Cheuk-Man Lee, *J. Heterocyclic Chemistry*, 1, 236 (1964).

The invention sought to be patented comprises chemical compounds having the molecular structure

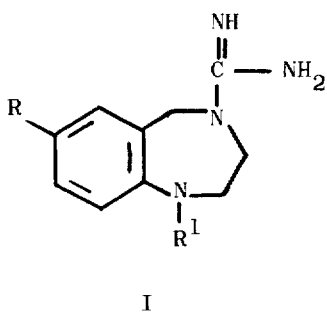

I wherein R is hydrogen, chlorine, bromine, fluorine, or iodine; $R^1$ is hydrogen, methyl, ethyl, or propyl; and the non-toxic, pharmaceutically acceptable acid addition salts thereof.

The compounds of Formula I possess hypotensive activity as demonstrated by standard laboratory test procedures.

The compounds of Formula I are prepared by treating 2,3,4,5-tetrahydro-1H-1,4-benzodiazepine or a 1-alkyl or 7-halo derivative thereof with 1-amidino-3,5-dimethylpyrazole nitrate at 190°–200°C.

The following examples are illustrative of the methods of making and using the compounds of the invention:

EXAMPLE I

3H-1,4-Benzodiazepine-2,5(1H,4H)-Dione

A mixture of isatoic anhydride (114.1 g), glycine ethyl ester hydrochloride (105 g) and pyridine (450 ml) was heated under reflux for 7 hr, then chilled in a cold room overnight. Product was collected on a filter and washed with water, then with ethanol several times. Yield of title compound: 73 g, mp. 328°–330° dec.

EXAMPLE II

7-Chloro-3H-1,4-Benzodiazepine-2,5(1H,4H)-Dione

A mixture of 5-chloroisatoic anhydride (197 g), glycine ethyl ester hydrochloride (140 g), and pyridine (1 liter) was refluxed with stirring for 7 hr. The reaction mixture was concentrated by distillation to ca. 250 ml, then was diluted with an equal amount of ethanol and chilled in ice. The precipitate thus separated was collected on a filter and washed repeatedly with ethanol to give 111.9 g of the title product, mp. 323°–325° dec.

The filtrate and the washings were combined and concentrated by evaporation under reduced pressure. The concentrated solution was poured into a large amount of water. The supernant water layer was decanted off, and fresh water was added. Chilling and scratching caused separation of a solid material. The precipitate was collected on a filter and recrystallized from ether to give 2-amino-5-chlorohippuric acid ethyl ester, mp. 104°–106°.

Analysis for: $C_{11}H_{13}ClN_2O_3$: Calculated: C, 51.47; H, 5.10; N, 10.91. Found: C, 51.57; H, 5.24; N, 10.95.

2-Amino-5-chlorohippuric acid ethyl ester cyclizes by heating in pyridine in the presence of pyridine hydrochloride. A mixture of 2.6 g of 2-amino-5-chlorohippuric acid ethyl ester, 1.0 g of pyridine hydrochloride, and 20 ml of pyridine was heated under reflux for 8 hr. Removal of pyridine under reduced pressure gave a solid residue which was collected on a filter and washed with water, then with ethanol to give 0.8 g of 7-chloro-3H-1,4-benzodiazepine-2,5(1H,4H)-dione, mp. 321°–322° dec.

EXAMPLE III

2,3,4,5-Tetrahydro-1H-1,4-Benzodiazepine

Powdered 3H-1,4-benzodiazepine-2,5(1H,4H)-dione (19.1 g) was added in small portions to a slurry of lithium aluminum hydride (11.3 g) in tetrahydrofuran (250 ml) at a rate which causes mild reflux. The resulting mixture was heated under reflux for 7 hr., then allowed to sit overnight. The mixture was treated with 11 ml of water, 11 ml of 15% aqueous NaOH solution, then with 33 ml of water. The inorganic salt was removed by filtration and washed with tetrahydrofuran several times. The filtrate and washings were combined, and evaporated under reduced pressure to give an oil which solidified on standing, giving 15.5 g of the title product, mp. 88°–93°. Recrystallization from ether raised the mp. to 93°–96°.

Analysis for: $C_9H_{12}N_2$: Calculated: C, 72.94; H, 8.16; N, 18.90. Found: C, 73.40; H, 8.31; N, 18.88.

EXAMPLE IV

7-Chloro-2,3,4,5-Tetrahydro-1H-1,4-Benzodiazepine

7-Chloro-2,3,4,5-tetrahydro-1H-1,4-benzodiazepine was prepared as in Example III from 31.4 g of 7-chloro-3H-1,4-benzodiazepine-2,5(1H,4H)-dione and 17.1 g of lithium aluminum hydride, giving 25.5 g of the title product. An analytical sample was obtained by recrystallization from ether with dry ice-acetone chilling, mp. 95°–98°.

Analysis for: $C_9H_{11}ClN_2$: Calculated: C, 59.18; H, 6.07; N, 15.34. Found: C, 59.80; H, 6.11; N, 15.46.

EXAMPLE V

2,3,4,5-Tetrahydro-1H-1,4-Benzodiazepine-4-Carboxamidine

A well blended mixture of 2,3,4,5-tetrahydro-1H-1,4-benzodiazepine (4.4 g) and 1-amidino-3,5-dimethylpyrazole nitrate (6.0 g) in a 50 ml round bottom flask was immersed in an oil bath maintaining the temperature of 190°–200° for 20 min. Sublimation of 3,5-dimethylpyrazole was observed. The sublimated 3,5-dimethylpyrazole on the neck of the reaction flask was removed mechanically. The solid residue was washed with ether, then recrystallized from a small amount of water with charcoal treatment, giving 3.65 g of the title product as the nitrate salt, mp. 232°–235°. Another recrystallization from water afforded an analytical sample, mp. 235°–237°.

Analysis for: $C_{10}H_{15}N_5O_3$: Calculated: C, 47.42; H, 5.97; N, 27.66. Found: C, 47.57; H, 5.84; N, 27.95.

EXAMPLE VI

7-Chloro-2,3,4,5-Tetrahydro-1H-1,4-Benzodiazepine-4-Carboxamidine

7-Chloro-2,3,4,5-tetrahydro-1H-1,4-benzodiazepine-4-carboxamidine was prepared as in Example V from 7-chloro-2,3,4,5-tetrahydro-1H-1,4-benzodiazepine (2.7 g) and 1-amidino-3,5-dimethylpyrazole nitrate (3.0 g) in 52% yield, mp. 270°–272°. An analytical sample which was obtained by recrystallization from water melted at 172° dec.

Analysis for: $C_{10}H_{14}ClN_5O_3$: Calculated: C, 41.74; H, 4.90; N, 24.34. Found: C, 41.68; H, 5.60; N, 24.27.

EXAMPLE VII

1,2,3,5-Tetrahydro-1-Methyl-4H-1,4-Benzodiazepine-4-Carboxamidine

A well blended mixture of 1-methyl-2,3,4,5-tetrahydro-1H-1,4-benzodiazepine (3.2 g) and 1-amidino-3,5-dimethylpyrazole nitrate (4.0 g) was fused at 190°–200° (oil bath temperature) for 45 minutes. 2,5-Dimethylpyrazole which deposited on the neck of the reaction flask was removed mechanically. The solid mass was washed with ether several times, then dissolved in hot water, treated with charcoal, and filtered. Chilling of the filtrate caused deposition of a solid contaminated with a small amount of an oil. The precipitate was collected on a filter, and washed with ethanol (3 times), with ether (3 times), then with ethanol again, yielding 2.6 g of the title product as the nitrate salt, mp. 200°–204° dec. Another recrystallization from water with treatment with charcoal raised the mp. to 210°–213° dec.

Analysis for: $C_{11}H_{17}N_5O_3$: Calculated: C, 49.43; H, 6.41; N, 26.20. Found: C, 49.41; H, 6.54; N, 26.33.

EXAMPLE VIII

A group of at least six rats is rendered hypertensive by applying a figure-of-eight legature around one kidney and performing a contralateral nephrectomy. Blood pressure will stabilize at a hypertensive level after approximately 6 weeks. Systolic pressure is measured by an indirect technique using a Decker Caudal Plethysmograph.

Each rat is given the test compound by the oral or I.P. route. Blood pressure is read prior to drug administration and at 2 and 24 hours thereafter. A control group of rats is run with each group of rats treated with the test compound. The results of the treated group are compared to the results of the untreated group by statistical analysis. When tested according to the above-described method, 2,3,4,5-tetrahydro-1H-1,4-benzodiazepine-4-carboxamidine and 1,2,3,5-tetrahydro-1-methyl-4H-1,4-benzodiazepine-4-carboxamidine provided a decrease in blood pressure at an oral dose of 75 mg/kg, and 7-chloro-2,3,4,5-tetrahydro-1H-1,4-benzodiazepine-4-carboxamidine provided a decrease in blood pressure at an oral dose of 100 mg/kg.

What is claimed is:

1. A compound of the formula

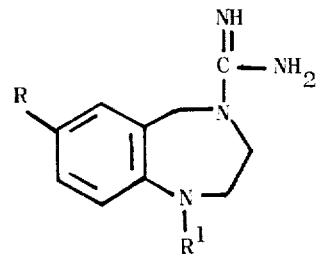

wherein R is hydrogen, chlorine, bromine, fluorine, or iodine; $R^1$ is hydrogen, methyl, ethyl, or propyl; and the non-toxic, pharmaceutically acceptable acid addition salts thereof.

2. A compound as defined in claim 1 which is: 2,3,4,5-Tetrahydro-1H-1,4-benzodiazepine-4-carboxamidine.

3. A compound as defined in claim 1 which is: 7-Chloro-2,3,4,5-tetrahydro-1H-1,4-benzodiazepine-4-carboxamidine.

4. A compound as defined in claim 1 which is: 1,2,3,5-Tetrahydro-1-methyl-4H-1,4-benzodiazepine-4-carboxamidine.

* * * * *